United States Patent
Gariepy et al.

(10) Patent No.: US 11,287,831 B2
(45) Date of Patent: Mar. 29, 2022

(54) APPARATUS, SYSTEMS, AND METHODS FOR OPERATING AND MAINTAINING ELECTRICALLY-POWERED MATERIAL-TRANSPORT VEHICLES

(71) Applicant: Clearpath Robotics Inc., Kitchener (CA)

(72) Inventors: Ryan Christopher Gariepy, Kitchener (CA); Matthew Allen Rendall, Waterloo (CA); John Duncan Edwards, Guelph (CA); Aaron Wilson, Cambridge (CA); Simon Drexler, Puslinch (CA); Scott Waters, Kitchener (CA); Aaron Gerlach, Hamilton (CA); Mark Podbevsek, Kitchener (CA); Michael Irvine, Mississauga (CA); Vaibhav Kumar Mehta, Kitchener (CA); Peiyi Chen, Waterloo (CA); Amritpal Saini, Kitchener (CA); Robert Dam, Waterloo (CA); Michael O'Driscoll, Waterloo (CA); Arsalan Alim, Mississauga (CA)

(73) Assignee: Clearpath Robotics Inc., Kitchener (CA)

( * ) Notice: Subject to any disclaimer, the term of this patent is extended or adjusted under 35 U.S.C. 154(b) by 190 days.

(21) Appl. No.: 16/447,163

(22) Filed: Jun. 20, 2019

(65) Prior Publication Data
US 2019/0366867 A1 Dec. 5, 2019

Related U.S. Application Data

(63) Continuation of application No. PCT/CA2018/050108, filed on Jan. 30, 2018.

(Continued)

(51) Int. Cl.
*G05D 1/02* (2020.01)
*B60L 53/66* (2019.01)
(Continued)

(52) U.S. Cl.
CPC .......... *G05D 1/0248* (2013.01); *B60L 50/60* (2019.02); *B60L 53/66* (2019.02); *B60P 1/02* (2013.01);
(Continued)

(58) Field of Classification Search
CPC .. G05D 1/0248; G05D 1/0212; G05D 1/0225; G05D 1/0231; G05D 1/0291;
(Continued)

(56) References Cited

U.S. PATENT DOCUMENTS

| | | |
|---|---|---|
| 5,075,853 A | 12/1991 | Luke |
| 2013/0095678 A1* | 4/2013 | Hara ...................... B60L 53/18 439/136 |

(Continued)

*Primary Examiner* — Aaron L Troost
(74) *Attorney, Agent, or Firm* — Bereskin & Parr LLP/S.E.N.C.R.L, s.r.l.

(57) ABSTRACT

There is provided an electrically-powered material-transport vehicle having a vehicle-charging contact on one side of the vehicle, and a second vehicle-charging contact on the opposite side of the vehicle. The vehicle has a load-bearing cap that covers the top of the vehicle, and a cap elevator for raising and lowering the cap. The cap can be raised and lowered to a transit position, a payload-engagement position, a charging position, and a maintenance position. In the transit position and payload-engagement position, the cap covers the vehicle-charging contacts so that they are not exposed. In the charging position, the cap is raised so that the vehicle-charging contacts are exposed. The vehicle can enter a charging-dock with the cap in the charging position in order to recharge the vehicle's battery.

20 Claims, 10 Drawing Sheets

Related U.S. Application Data

(60) Provisional application No. 62/451,905, filed on Jan. 30, 2017.

(51) Int. Cl.
*B60P 1/02* (2006.01)
*B60L 50/60* (2019.01)

(52) U.S. Cl.
CPC ......... *G05D 1/0212* (2013.01); *G05D 1/0225* (2013.01); *G05D 1/0231* (2013.01); *G05D 1/0291* (2013.01)

(58) Field of Classification Search
CPC .......... B60L 50/60; B60L 53/66; B60L 53/16; B60L 53/34–36
See application file for complete search history.

(56) References Cited

U.S. PATENT DOCUMENTS

| | | | |
|---|---|---|---|
| 2016/0072341 A1* | 3/2016 | Tamura | B60L 58/19 |
| | | | 307/66 |
| 2016/0200205 A1 | 7/2016 | Bolik et al. | |
| 2016/0260049 A1* | 9/2016 | High | G05D 1/021 |
| 2016/0288658 A1* | 10/2016 | Rudolph | B60L 3/0046 |

\* cited by examiner

APPARATUS, SYSTEMS, AND METHODS FOR OPERATING AND MAINTAINING ELECTRICALLY-POWERED MATERIAL-TRANSPORT VEHICLES

CROSS-REFERENCE TO RELATED PATENT APPLICATIONS

The application is a continuation of International Application No. PCT/CA2018/050108 filed on Jan. 30, 2018 which claims the benefit of U.S. Provisional Application No. 62/451,905, filed on Jan. 30, 2017. The complete disclosure of International Application No. PCT/CA2018/050108 and U.S. Provisional Application No. 62/451,905 are incorporated herein by reference.

FIELD

The described embodiments relate to robotic vehicles, and in particular, to operating and maintaining electrically-powered material transport vehicles.

INTRODUCTION

Automated-guided vehicles ("AGVs") may be used as material transport vehicles for applications such as inventory management and parts delivery within facilities such as warehouses and manufacturing plants. Typical AGVs may pull a cart or a train of carts that contain inventory items or parts for assembly. In some cases, AGVs may include a lifting platform, and may transport a cart by driving underneath the cart and lifting the platform in order to engage the cart from below.

Traditional AGVs are generally limited with respect to autonomy, and rely on arbitrary objects that are intended to serve as a frame of reference within a known environment. As such, these AGVs are considered to be semi-autonomous. For example, "line-follower" AGVs may rely on magnetic strips, lines, traces, or tracks places on the floor of a facility in order to navigate through the facility. Other vehicles may have a higher degree of autonomy that does not require magnetic strips, lines, traces, or tracks. However, these vehicles are still not considered to be autonomous because they are not capable of determining their own travel paths. In other words, these vehicles require a remote computer system to instruct them and provide a navigational path, which the vehicle is not capable of determining on its own.

Electric vehicles require that their batteries be recharged. Currently, electric vehicles are generally charged in one of two ways. One approach, which may be used with vehicles such as electric cars, requires that an electric plug extending from a charger be connected to a charging port on the vehicle. This approach necessitates human intervention, thereby detracting from the benefits of an automated vehicle operating with some degree of autonomy. Another approach is to design a charging station or dock that mates with electrodes located on the front, back, or underside of the vehicle. With this approach, safety is a significant concern, and low-power charging systems are therefore used, which require a relatively long time to charge. Systems that transmit higher power further require that the vehicle be equipped with an active charging interface system, for example stepper motors and the like, for lowering mating electrodes to the electrodes located on the floor, and/or they require that the vehicle has a lower ground clearance. Unless a potentially dangerous electrode is placed on the floor for mating with the underside of the vehicle, charging stations are generally unidirectional, meaning that a vehicle must drive into the charging station and then reverse out of the charging station in the opposite direction from which it entered. In some cases, unidirectional charging stations represent inefficiencies with respect to the routes that a vehicle may take to or from the charging station, or in respect of charging multiple vehicles in a queue with a single charging station over time.

SUMMARY

In a first aspect, some embodiments provide a method for charging a vehicle. The method comprises driving the vehicle towards a charging dock, raising a cap of the vehicle to expose a first vehicle-charging contact on a first side of the vehicle and a second vehicle-charging contact on a second side of the vehicle (with the second side of the vehicle opposite the first side of the vehicle), driving the vehicle into the charging dock, electrically connecting a first charger contact of the charging dock with the first vehicle-charging contact and electrically connecting a second charger contact of the charging dock with the second vehicle-charging contact, driving the vehicle out of the charging dock, and lowering the cap of the vehicle to cover the first and second vehicle-charging contact. The cap of the vehicle comprises a load-bearing platform for transporting a payload.

In a second aspect, some embodiments provide a method for charging a vehicle with a charger. The method comprises docking the vehicle in a charging dock, electrically connecting a vehicle-charging contact on the vehicle with a charger contact, electrically connecting a vehicle-signal contact on the vehicle with a charger-signal contact, receiving at the charger-signal contact a signal from the vehicle-signal contact, the signal being indicative of the presence of the vehicle in the charging dock, and electrically connecting the charger contacts to the charger after the signal is received.

According to some embodiments, the method further comprises electrically connecting the vehicle-charging contact to a battery of the vehicle after the signal has been received.

In a third aspect, some embodiments provide a method for transporting a payload with a vehicle. The method comprises navigating the vehicle towards a proximity of the payload with a cap of the vehicle in a first position, navigating the vehicle within the proximity to position the vehicle under the payload, raising the cap of the vehicle to a second position to engage the payload, navigating the vehicle to a payload destination with the cap of the vehicle engaged with the payload, lowering the cap of the vehicle to the first position at the payload destination to disengage the payload, and navigating the vehicle away from the payload destination with the cap in the first position.

According to some embodiments, navigating the vehicle towards the proximity of the payload with the cap of the vehicle in a first position comprises receiving a pre-payload location within the proximity from a fleet-management system, and using the vehicle to determine a path to the pre-payload location.

According to some embodiments, navigating the vehicle within the proximity to position the vehicle under the payload comprises navigating the vehicle using an optical sensor on the vehicle.

According to some embodiments, the pre-payload location is a pre-payload waypoint.

According to some embodiments, navigating the vehicle using an optical sensor on the vehicle comprises using an optical sensor to capture an image of a target at a payload location, determining the payload location based on the image of the target, and navigating the vehicle based on the payload location.

According to some embodiments, navigating the vehicle to the payload destination comprises receiving a destination location associated with the payload destination from the fleet-management system.

In a fourth aspect, some embodiments provide an electrically-powered vehicle for transporting a payload. The vehicle comprises a base having a first vehicle-charging contact on a first side of the base, a cap elevator attached to the base and extendible from a first position upwards from the base to a second position, and a cap having a first side cover corresponding to the first vehicle-charging contact. The cap is attached to the cap elevator so that, when the cap elevator is in the first position, the first vehicle-charging contact is covered by the first side cover, and when the cap elevator is in the second position, the first vehicle-charging contact is not covered by the first side cover.

According to some embodiments, the cap is a load-bearing platform for transporting the payload.

According to some embodiments, the cap is sized to cover the top of the base.

According to some embodiments, the vehicle further comprises a second vehicle-charging contact on a second side of the base, and a second side cover corresponding to the second vehicle-charging contact. Thus, when the cap elevator is in the first position, the second vehicle-charging contact is covered by the second side cover, and when the cap elevator is in the second position the second vehicle-charging contact is not covered by the second side cover.

According to some embodiments, the vehicle further comprises a battery and a first switch connected to the battery and the first vehicle-charging contact for electrically connecting and electrically disconnecting the battery and the first vehicle-charging contact.

According to some embodiments, the vehicle further comprises a second vehicle-charging contact on a second side of the base, a second switch connected to the battery and the second vehicle-charging contact for electrically connecting and electrically disconnecting the battery and the second vehicle-charging contact, and a second side cover corresponding to the second vehicle-charging contact. Thus, when the cap elevator is in the first position, the second vehicle-charging contact is covered by the second side cover, and when the cap elevator is in the second position the second vehicle-charging contact is not covered by the second side cover.

According to some embodiments, the vehicle further comprises a first vehicle-signal contact on the base for sending a signal to a corresponding charger-signal contact on a charging dock.

In a fifth aspect, some embodiments provide an electrically-powered vehicle for transporting a payload, comprising a base having a first vehicle-charging contact and a second vehicle-charging contact, the vehicle-charging contacts located on at least a first side of the base, at least one contact cover corresponding to the first vehicle-charging contact and the second vehicle-charging contact, at least one actuator connected to the at least one contact cover for moving the first contact cover from a first position to a second position such that, when the actuator is in the first position, the at least one contact cover covers the first and second vehicle-charging contacts, and when the actuator is in the second position, the at least one contact cover does not cover the first and second vehicle-charging contacts.

According to some embodiments, the first vehicle-charging contact is on the first side of the base and the second vehicle-charging contact is on a second side of the base.

According to some embodiments, the at least one contact cover comprises a first contact cover corresponding to the first vehicle-charging contact and a second contact cover corresponding to the second vehicle-charging contact.

According to some embodiments, the first vehicle-charging contact is on the first side of base and the second vehicle-charging contact is on the first side of the base.

According to some embodiments, the at least one contact cover comprises a single contact cover that corresponds to the first vehicle-charging contact and the second vehicle-charging contact.

According to some embodiments, the at least one contact cover comprises a first contact cover that corresponds to the first vehicle-charging contact and a second contact cover that corresponds to the second vehicle-charging contact.

According to some embodiments, the vehicle further comprises at least one vehicle-signal contact for providing a signal to a charging dock indicative of a presence of the vehicle.

According to some embodiments, the vehicle further comprises a first vehicle-signal contact on the first side of the base and a second vehicle-signal contact on the second side of the base.

According to some embodiments, when the actuator is in the first position, the at least one contact cover covers the first and second vehicle-charging contacts and the first and second vehicle-signal contacts.

In a sixth aspect, some embodiments provide an electrically-powered vehicle. The vehicle comprises an electric motor, a battery connected to the electric motor, a first vehicle-charging contact connected to the battery, and a second vehicle-charging contact connected to the battery. The first vehicle-charging contact is located on a first side of the vehicle, and the second vehicle-charging contact is located on a second side of the vehicle opposite the first side.

According to some embodiments, the first vehicle-charging contact comprises a first vehicle-charging rail and the second vehicle-charging contact comprises a second vehicle-charging rail.

According to some embodiments, the first vehicle-charging rail has a length that is the same as a length of the first side of the vehicle, and the second vehicle-charging rail has a length that is the same as a length of the second side of the vehicle.

In a seventh aspect, some embodiments provide an electrically-powered vehicle. The vehicle comprises an electric motor for moving the vehicle, a battery for supplying power to the electric motor, a vehicle-charging contact for receiving a charge from a charging dock, the vehicle-charging contact being connected to the battery through a battery switch, a vehicle-signal contact for providing communication between the vehicle and the charging dock, and a vehicle-control system in communication with the battery switch and the vehicle-signal contact. The vehicle-control system is configured to send a vehicle-presence signal to the charging dock via the vehicle-signal contact to indicate presence of the vehicle in the charging dock, receive a vehicle-confirmation signal via the vehicle-signal contact to confirm presence of the vehicle in the charging dock, close the battery switch to connect the vehicle-charging contact to the battery while the vehicle-confirmation signal is being received, and open the battery switch to disconnect the vehicle-charging contact from the battery while the vehicle-confirmation signal is not being received.

In an eighth aspect, some embodiments provide a device for charging an electrically-powered vehicle. The vehicle comprises a charging contact for connecting to a vehicle-charging contact of the vehicle, a charger switch connected to the charging contact for connecting the charging contact to a charger when the charger switch is closed, a signal contact for connecting to a vehicle-signal contact of the vehicle, and a charger-switch controller for controlling the charger switch. The charger controller is configured to receive a vehicle-presence signal from the vehicle via the signal contact to indicate presence of the vehicle, close the charger switch to connect the charger contact with the charger while the vehicle-confirmation signal is being received, and open the charger switch to disconnect the charger contact from the charger while the vehicle-confirmation signal is not being received.

According to some embodiments, the charger controller is further configured to transmit a vehicle-confirmation signal via the signal contact to confirm presence of the vehicle after the vehicle-presence signal has been received.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
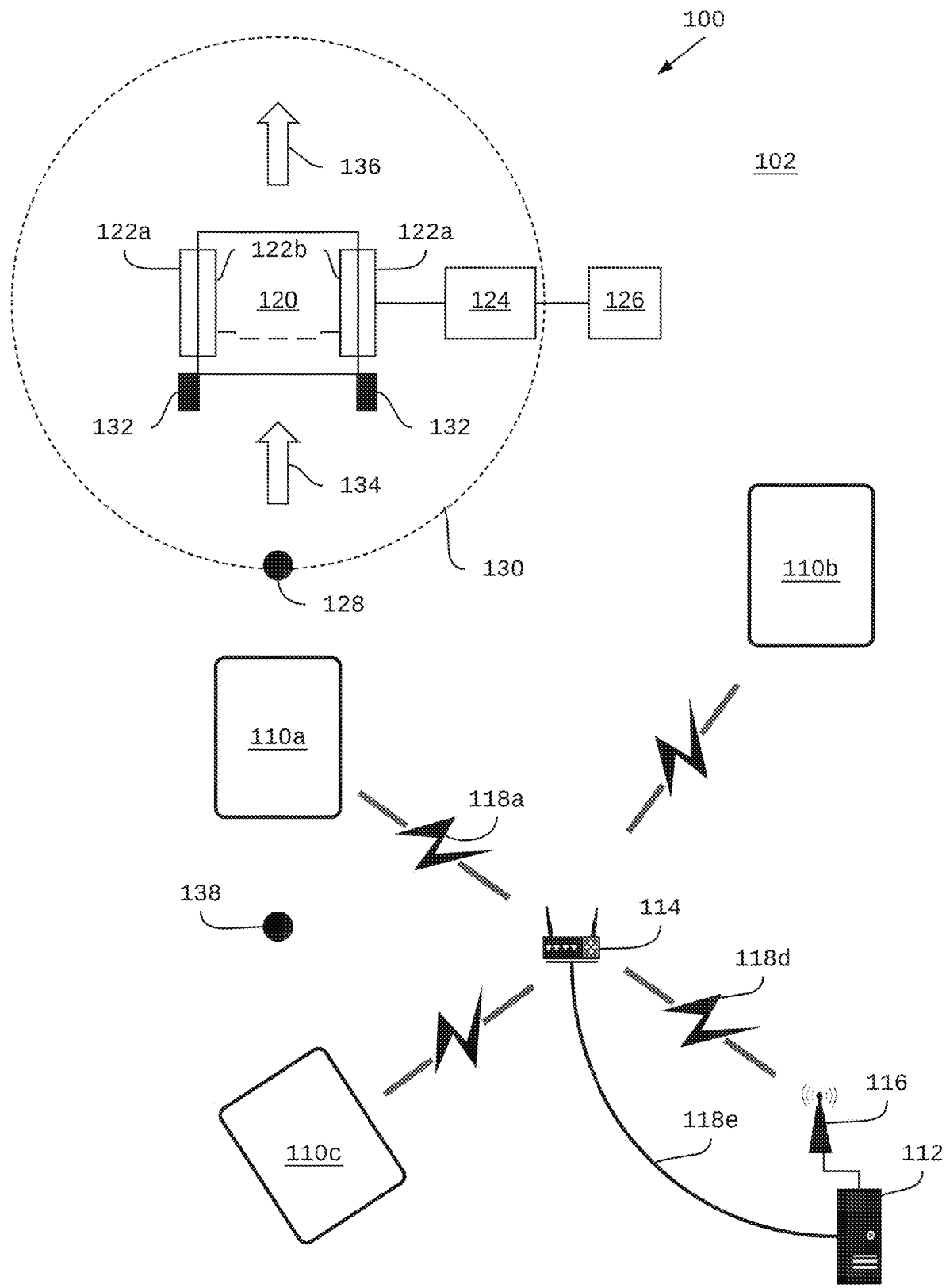
FIG. 1 is a schematic of a system for charging and recharging an electrically-powered vehicle, according to some embodiments.

Referring to FIG. 1, there is shown a system 100 for charging and recharging electrically-powered vehicles, which may be part of a larger system for transporting a payload with a vehicle within an environment 102 such as an industrial facility. The system 100 comprises a fleet of electrically-powered vehicles 110a, 110b, and 110c (which may be collectively referred to here as the vehicle 110 or the vehicles 110), a charging dock 120, and a fleet-management system 112.

The fleet-management system 112 may communicate with the vehicles 110 through a network 114. For example, the fleet-management system may be equipped with a wireless transceiver 116 in order to communicate with the network 114 over a wireless link 118d, and/or the fleet-management system 112 may communicate with the network 114 over a wired link 118e. The network 114, communication links 118a, 118d, and 118e, and other associated equipment may comprise the Internet, an intranet, a local-area network, a wide-area network, a virtual private network, etc., and may implement any known protocols for such types of networks, as well as proprietary protocols.

According to some embodiments, the electrically-powered vehicles 110 may be of any type of motorized ground vehicle that uses electric power. This includes but is not limited to automobiles, trucks, robotic vehicles, unmanned-ground vehicles, automated-guided vehicles ("AGVs", also known as autonomous guided vehicles), and self-driving vehicles ("SDVs", also known as robotic vehicles).

As referred to herein, automated-guided vehicles differ from self-driving vehicles by the degree of automation and autonomy of each. In particular, automated-guided vehicles are considered to be semi-autonomous, since they rely on arbitrary objects intended to serve as a point of reference within a known environment, such as magnetic strips, lines, traces, or tracks. With this in mind, it is generally erroneous to refer to an AGV as an "autonomous" guided vehicle. In contrast, self-driving vehicles are considered to be fully autonomous, since they act independently of direct human control, and are capable of sustaining high levels of navigational performance in an uncertain or unknown environment. A person skilled in the art will appreciate that, while both self-driving vehicles and automated-guided vehicles may be considered as automated vehicles generally, self-driving vehicles represent significant challenges in navigation, control, and artificial intelligence that are not relevant to automated-guided vehicles.

The charging dock 120 comprises a pair of charging contacts 122a. A person skilled in the art will appreciate that a "pair" of charging contacts are generally always required in order to provide a voltage for charging a battery. Thus, a "charging contact" may be considered to correspond to a single electrode. According to some embodiments, and as shown in the FIG. 1, the charging contacts 122a are placed on opposite sides of the charging station 120. In the embodiment shown, the charging contacts 122a are sufficiently spaced apart as to allow a vehicle 110 to drive between them. In other words, the charging dock 120 is sized appropriately to allow a vehicle 110 to drive into the charging dock 120.

The charging contacts 122a are electrically connected to a charger 126. According to some embodiments, for example, as shown in FIG. 1, the charging contacts 122a are connected to the charger 126 through a charge controller 124. The charger 126 supplies power (i.e. a charging current, voltage) to the charging dock 120 in order to charge the battery of a vehicle 110 when the vehicle 110 is in the charging dock 120. As will be appreciated, in some cases, the charger 126 requires its own power supply (not shown).

According to some embodiments, the charge controller 124 is used to control the supply of power from the charger 126, such as by activating or deactivating the charger 126. In some cases, the charge controller 124 may be connected between the charging contacts 122a and the charger 126 so that the charging current flows through the charge controller 124 from the charger 126 to the charging contacts 122a. In this case, the charger controller 124 is directly connected to both the charging contacts 122a and the charger 126. When the charge controller 124 is directly connected between the charger 126 and the charging contacts 122a, the charge controller 124 may include a switch (e.g. a relay) in order to connect the charger 126 with the charging contacts 122a.

In other cases, the charger 126 may be directly connected to the charging contacts 122a, and the charge controller 124 may be in communication with the charger 126. In this case, the charge controller 124 may activate or deactivate the charger 126, for example, communicating with the charger 126, and activating a switch (e.g. a relay) within the charger 126.

The charging contacts 122a may comprise a conductive material such as copper (or any other conductor), and may have a size, shape, and/or position selected for forming an electrical connection with corresponding vehicle-charging contacts on a vehicle 110. For example, the charging contacts 122a may be a pad, strip, or rail. The particular size and shape of the charging contacts 122a may be selected in order to ensure physical compatibility with the vehicle-charging contacts on the vehicle 110, but also to ensure that desired electrical characteristics can be achieved in order to provide a desired charging current through the charging contacts 122a.

According to some embodiments, the charging contacts 122a may be biased towards the center of the charging dock 120, such as with a biasing spring, in order to allow a vehicle 110 to enter the charging dock 120 and form an electrical connection between the charging contact 122a and the vehicle 110.

According to some embodiments, the charging dock 120 may also include a signal contact 122b. In some embodiments, a single signal contact 122b may be used, and, in other embodiments, more than one signal contact 122b may be used. According to some embodiments, such as is shown in FIG. 1, the charging dock 120 may include a pair of charging contacts 122b that are sufficiently spaced apart as to allow a vehicle 110 to drive between them. For example, each of the pair of signal contacts 122b may be placed adjacent a corresponding charging contact 122a, such as above, below, in front, or behind the charging contact 122a. In this way, vehicle-signal contacts on the vehicle 110 may form electrical connections with the signal contacts 122b, while vehicle-charging contacts on the vehicle 110 simultaneously from electrical connection with the charging contacts 122a.

According to some embodiments, and as indicated by the dashed line in FIG. 1, two signal contacts 122b may be electrically connected, for example, through a conductor that runs underneath the charging dock 120 or through a plate at the bottom of the charging dock 120. In this way, an electrical circuit could be formed by electrically connecting the two signal contacts 122b, for example, by driving a vehicle 110 into the dock 120.

In some cases, the signal contacts 122b may be in communication with the charge controller 124. For example, the charge controller 124 may receive a signal communicated by a vehicle 110 in the charging dock 120 through the signal contacts 122b. In this way, the charge controller 124 can activate or deactivate the charger 126 based on a signal received via the signal contacts 122b that indicates that a vehicle 110 is present in the charging dock 120 (i.e. a vehicle-presence signal).

According to some embodiments, the signal contacts 122a may not require that an electrical contact be made with vehicle-signal contacts on a vehicle 110 in order to send a vehicle-presence signal to the charge controller 124. In other words, in some embodiments, the signal contacts 122a may be sensors or receivers for receiving a wireless signal. Such sensors or receivers may cover a wide variety of technologies, from a magnetic sensor that detects the presence of a vehicle 110, to proximity sensors, to a higher-level wireless communications protocol (e.g. RFID).

It is further contemplated that, in some embodiments in which the location of a vehicle 110 can be determined (e.g. the vehicle 110 includes a localization function, and/or the fleet-management system 112 tracks the location of the vehicle 110), the location of the vehicle 110 as determined by the vehicle 110 and/or fleet-management system 112 can be used to determine whether the vehicle 110 is in the charging dock 120. In this case, the known location of the vehicle 110 can be used to trigger a vehicle-presence signal at the charge controller 124.

According to some embodiments, the charging dock 120 may also include one or more targets 132. For example, as shown in FIG. 1, the charging dock 120 has two targets 132, with each target 132 located on each side of the charging dock 120.

The targets 132 can be included on the charging dock 120 in order to serve as a local navigational aid for the vehicle 110 as it is navigating towards the charging dock 120, in response to a request or requirement for the vehicle 110 to be charged.

Request and requirements for a particular vehicle 110 to charge may be generated in a variety of ways, both by the vehicle 110, and by the fleet-management system 112. For example, in some cases, the vehicle 110 may have the capability to monitor the charge of its own battery, such as through a battery-monitoring unit. In this case, the vehicle 110 may be able to determine when a battery charge is required, and/or the vehicle 110 may be able to determine the charge level remaining for the battery at any time.

According to some embodiments, the fleet-management system 112 may estimate whether the vehicle 110 requires a charge, and/or the charge level remaining for the battery at any time. For example, the fleet-management system 112 may use known parameters of the battery, information pertaining to previous charge cycles of the vehicle 110, historic information pertaining to charge cycles of other similar vehicles in a fleet, the time since the last charge, the activity of the vehicle since the last charge, and/or the forecast requirements for the vehicle (e.g. how much charge would be required to complete a scheduled mission or task) in order to estimate whether the vehicle 110 requires a charge.

In some cases, the fleet-management system 112 may receive the current charge level remaining from the vehicle 110 itself (e.g. as measured by the vehicle's battery management unit and transmitted to the fleet-management system 112). It is also possible to use a combination of different methods, for example, if the fleet-management system 112 receives a charge-level measurement from the vehicle 110, and then later determines an estimated charge level based on the last-known charge received from the vehicle 110.

Both charge requirements and charge requests are contemplated. Generally, they may both be used in order to determine when a vehicle 110 should receive a command or instructions to navigate to the charging dock 120 and receive a charge. Specifically, a charge request may be based on a preference to charge a vehicle 110 even though the current charge level may be sufficient to power the vehicle 110 for scheduled missions or an acceptable window of time. Thus, charge requests may be determined based on the optimization of various resources. For example, the battery of a particular vehicle 110 may have a 50% charge, and the 50% charge may be sufficient to complete the next two scheduled missions for the vehicle 110. However, if the vehicle 110 has sufficient time between missions, then a charge request may be generated so that the vehicle 110 can be charged above 50% in order to make use of the time resources available to the vehicle 110. In other words, if the vehicle 110 is not being used for a mission during a particular period of time, then the vehicle may navigate to the charging dock 120 and receive a charge even though a charge is not actually necessary (i.e. required) at that particular time. It is possible to define "charging" as a mission itself, such that a vehicle may have a mission schedule that comprises: mission 1—deliver payload A; mission 2—charge; mission 3—deliver payload B. However, for the sake of clarity of explanation herein, reference to charging the vehicle between missions is based on a definition of "missions" that does not include "charging" as a type of mission.

According to some embodiments, a request to charge may be determined by any or all of a vehicle's mission schedule (e.g. the available time between scheduled missions for the vehicle 110 to charge), the number of missions scheduled for the vehicle 110 in the future, the number of missions completed by the vehicle 110 since its last charge, the time-availability of a charging dock 120 (i.e. whether the charging dock is being used by other vehicles), the location of the vehicle 110 in relation to the location of a charging dock 120, the charge level of the vehicle's battery (e.g. as determined by a battery-management unit on the vehicle 110), an estimated charge level of the vehicle's battery (e.g. as estimated by the vehicle 110 and/or by the fleet-management system 112), and a preferred or target charge range of the battery (e.g. it may be preferred to maintain the battery between 50% and 90% charge). With respect to the vehicle's missions, a request to charge may be based on the time taken to execute a mission, the speed of the vehicle 110 during the mission, and the payload associated with a mission (e.g. the mass of the payload).

According to some embodiments, the fleet-management system 112 may use information pertaining to charge requests in order determine or optimize a fleet schedule, and assign particular missions to particular vehicles 110 within the fleet. For example, when selecting a particular vehicle 110 from a fleet of vehicles, one of the selection criteria may be the time since the particular vehicle's last charge request, or the likelihood that a charge request for the particular vehicle 110 would occur before a charge request for another vehicle in the fleet.

A requirement to charge may be determined based on a minimum-acceptable charge level for a battery. For example, if the vehicle 110 determines that the charge of its battery is below, or in some embodiments, approaching a minimum-acceptable charge level, then the vehicle may generate a signal indicating that a charge is required. According to some embodiments, the vehicle 110 may include a batter-management unit that may determine the charge level of the battery, and/or whether a charge is required. In some embodiments, the fleet-management system may estimate that the battery of a particular vehicle 110 is below, or approaching the minimum-acceptable charge level, in which case the fleet-management system 112 may generate a signal indicating that a charge is required.

According to some embodiments, it may be generally preferred to navigate a vehicle 110 in response to a charge being requested, rather than a charge being required, since, when a charge is required, the short-term need to navigate the vehicle 110 to the charging dock 120 may impact the vehicle's ability to execute a mission, and/or may impact the utilization of a fleet of vehicles 110 to execute multiple missions. For example, if a vehicle 110 requires a charge, then the fleet-management system 112 may be required to find a replacement vehicle from elsewhere in the fleet, which may impact other mission schedules.

When a signal has been generated by either the vehicle 110 or the fleet-management system 112 that indicates a request for a charge or a requirement for a charge, then the vehicle 110 is navigated to a charging dock 120.

According to some embodiments, the vehicle 110 may begin to navigate to the charging dock 120 after receiving the location of a waypoint 128. For example, the vehicle 110 may receive the location of a waypoint 128 from the fleet-management system 112, for example, as a part of an instruction to charge, which may be associated with a request or requirement to charge. Alternatively, or additionally, the vehicle 110 may know the location of the waypoint 128 prior to identifying a particular request or requirement to charge, in which case, the fleet-management system 112 may not have to send the location of the waypoint 128 to the vehicle 110. (In other words, in some embodiments, the vehicle 110 may be able to determine the location of the waypoint 128, and/or select a particular waypoint 128 from a plurality of waypoints 128 within the environment 102 based on information that is stored on the vehicle 110). Other instances of a charging dock 120 are not shown in FIG. 1 for simplicity of explanation.

According to some embodiments, the vehicle 110 may plan a path for the vehicle 110 to navigate towards the waypoint 128. For example, the vehicle 110 may include a sufficient level of autonomy such that the vehicle can determine and/or store its own map of the environment 102, and then plan its own path within the environment 102. In some cases, the vehicle 110 may receive a path or path-related information from the fleet-managements system 112. Once the path from the vehicle's location to the waypoint 128 has been determined, the vehicle navigates to the waypoint 128.

The waypoint 128 is an example of a particular location that generally defines a proximity 130 from the charging dock 120. According to some embodiments, navigating the vehicle 110 to the charging dock 120 involves a two-step process. First, the vehicle 110 navigates to within the proximity 130 (e.g. to the waypoint 128) based on a map of the environment 102 and a path to the waypoint 128 based on the map. Second, the vehicle 110 navigates from within the proximity 130 (e.g. navigates away from the waypoint 130) using sensors for detecting objects (e.g. the targets 132) within the vehicle's local environment. In this way, the vehicle 110 can achieve the navigational accuracy necessary for docking with the charging dock 120 (e.g. obtaining electrical connections between the charging contacts 122a and the vehicle-charging contacts) even if the map-based navigational methods of the vehicle 110 do not provide the required accuracy.

In cases in which the vehicle 110 is implementing the two distinct navigational modes as provided above, the vehicle may generally rely on optical sensors such as LiDARs and image sensors (e.g. cameras) to navigate while in the second mode. As such, the targets 132 can be used as navigational aids when the vehicle 110 is within the proximity 130 (i.e. navigating in the second mode). According to some embodiments, it may not be necessary to equip the docking station 120 with specific targets 132. Rather, the vehicle 110 may be equipped with a vision system (e.g. using optical sensors) that can recognize an image of the docking station 120 itself, without the need for the targets 132.

Furthermore, the vehicle 110 may not be sent to a specific waypoint 128 prior to implementing the second navigational mode. In this case, rather than navigating the vehicle 110 to a specific location waypoint 128, the vehicle may navigate to anywhere within the proximity 130. In other words, the waypoint 128 may, effectively, be the area within the proximity 130.

In some cases, a second waypoint 138 can be established in order to queue one or more vehicles 110 prior to entering the charging dock 120. For example, if a first vehicle 110a is at the waypoint 128, within the proximity 130, or docked in the charging dock 120, and a second vehicle 110c is navigating towards the charging dock 120 in response to a request or requirement to charge the vehicle 110c, then the vehicle 110c may generate or receive instructions to wait at the waypoint 138 prior to proceeding to the waypoint 128. In this way, the vehicle 110c can rely on map-based navigation until such time as the charging dock 120 is available to receive the vehicle 110c.

A vehicle 110 will generally approach the charging dock 120 by moving towards the charging dock 120 in a direction indicated by the dock-entry arrow 134. Once in the dock, the vehicle 110 will receive a charge. According to some embodiments, the vehicle 110 may then leave the charging dock 120 in a direction indicated by the dock-exit arrow 136. The dock-exit direction 136 may be approximately the same as the dock-entry direction 134, thereby establishing "drive-through" charging. In order to establish drive-through charging, the charging dock 120 must not include any structures that will impede the vehicle 110 traveling through the charging dock 120 in the dock-exit direction 136. This can be accomplished, for example, by providing the charging contacts 122a on at least one side of the charging dock 120, and by providing a vehicle 110 with corresponding vehicle-charging contacts on at least one side of the vehicle 110.

Figure 2:
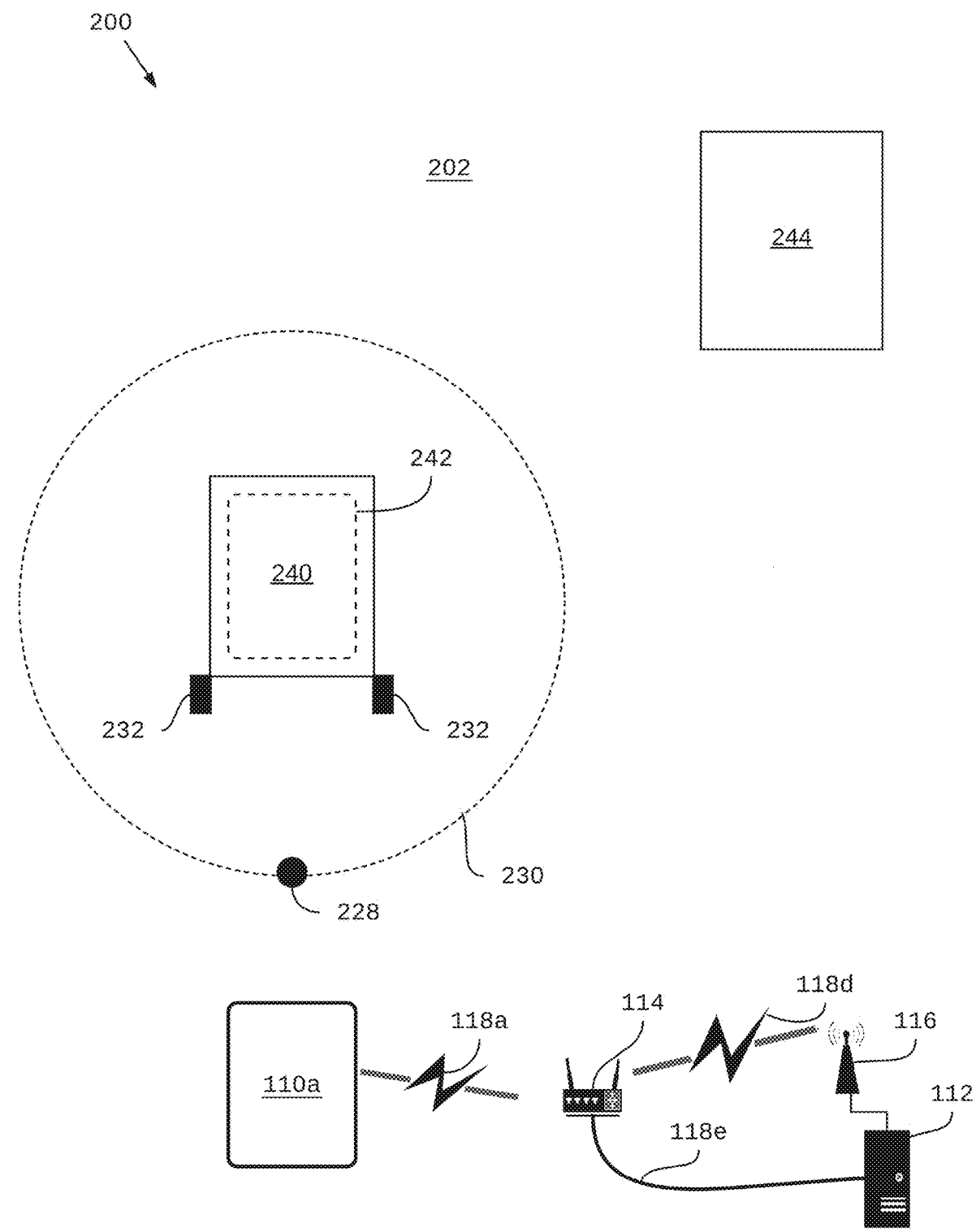
FIG. 2 is a schematic of a system for transporting a payload with a material-transport vehicle, according to some embodiments.

Referring to FIG. 2, there is shown a system 200 for transporting a payload with a vehicle within an environment 202. The environment 202 is generally the same as the environment 102, and/or the environment 102 and the environment 202 may together comprise an environment. The system 200 generally related to the system 100 in that it comprises vehicles 110, a fleet-management system 112, and related communications networking equipment. Generally, the system 100 and the system 200 may together comprise a single system.

The system 200 includes a payload 240. The payload 240 may be of various types and forms. For example, the payload 240 may be a wheeled cart that can be moved on its wheels by a vehicle 110. The payload 240 may be a shelf or table (e.g. without wheels) that can be lifted and transported by a vehicle 110. The payload 240 may involve a pick-up-and-drop-off stand such that the vehicle 110 can pick-up or drop-off a payload from the pick-up-and-drop-off stand, for example, by driving under the stand and lifting the payload off the stand from underneath. In some embodiments, the payload 140 may include an interface 240 with a size, shape, and position selected to complement the top of a vehicle 110 so that the vehicle 110 can engage with the payload 140.

According to some embodiments, the payload 240 may also include one or more targets 232. For example, as shown in FIG. 2, the payload 240 has two targets 232, with each target 232 located on each side of the payload 240.

The targets 232 can be included on the payload 140 in order to serve as a local navigational aid for the vehicle 110 as it is navigating towards the payload 140, for example, as part of a mission.

According to some embodiments, the vehicle 110 may begin to navigate to the payload 240 after receiving the location of a waypoint 228. For example, the vehicle 110 may receive the location of a waypoint 228 from the fleet-management system 112, for example, as a part of a mission.

According to some embodiments, the vehicle 110 may plan a path for the vehicle 110 to navigate towards the waypoint 228. For example, the vehicle 110 may include a sufficient level of autonomy such that the vehicle can determine and/or store its own map of the environment 202, and then plan its own path within the environment 202. In some cases, the vehicle 110 may receive a path or path-related information from the fleet-managements system 112. Once the path from the vehicle's location to the waypoint 228 has been determined, the vehicle navigates to the waypoint 228.

The waypoint 228 is an example of a particular location that generally defines a proximity 230 from the payload 240. According to some embodiments, navigating the vehicle 110 to the payload 240 involves a two-step process. First, the vehicle 110 navigates to within the proximity 230 (e.g. to the waypoint 228) based on a map of the environment 202 and a path to the waypoint 228 based on the map. Second, the vehicle 110 navigates from within the proximity 230 (e.g. navigates away from the waypoint 230) using sensors for detecting objects (e.g. the targets 232) within the vehicle's local environment. In this way, the vehicle 110 can achieve the navigational accuracy necessary for engaging with the payload (e.g. engage the payload 240 with the top of the vehicle 110) even if the map-based navigational methods of the vehicle 110 do not provide the required accuracy for engaging with the payload 240.

In cases in which the vehicle 110 is implementing the two distinct navigational modes as provided above, the vehicle may generally rely on optical sensors such as LiDARs and image sensors (e.g. cameras) to navigate while in the second mode. As such, the targets 232 can be used as navigational aids when the vehicle 110 is within the proximity 230 (i.e. navigating in the second mode). According to some embodiments, it may not be necessary to equip the payload 240 with specific targets 232. Rather, the vehicle 110 may be equipped with a vision system (e.g. using optical sensors) that can recognize an image of the payload 240 itself, without the need for the targets 232.

Furthermore, the vehicle may not be sent to a specific waypoint 228 prior to implementing the second navigational mode. In this case, rather than navigating the vehicle 110 to a specific location waypoint 228, the vehicle may navigate to anywhere within the proximity 230. In other words, the waypoint 228 may, effectively, be the area within the proximity 230.

Once the vehicle 110 has engaged with the payload 240 (i.e. has picked up the payload), the vehicle 110 may transport the payload 240 to a destination location 244, such as may be determined by the vehicle's mission.

Figure 3:
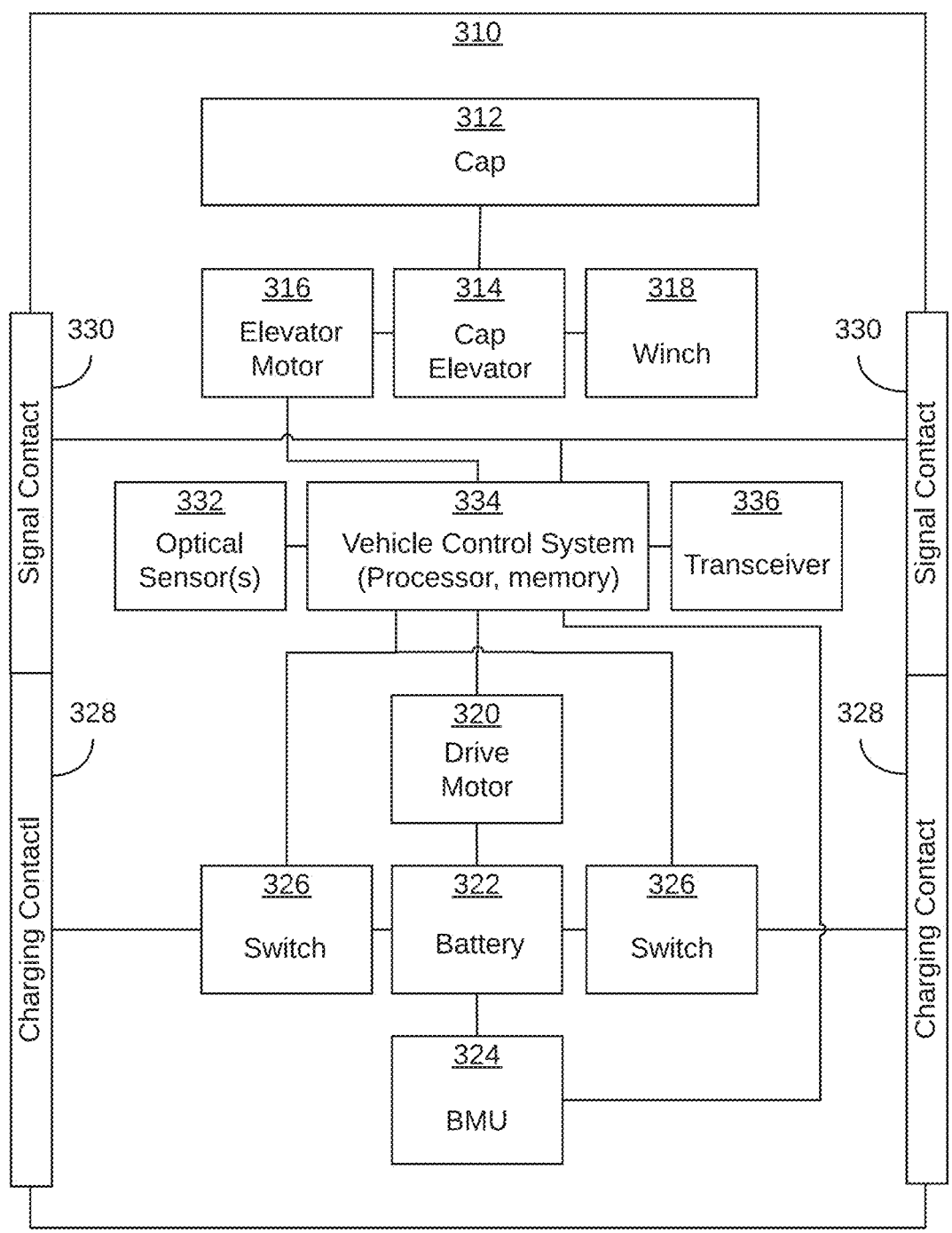
FIG. 3 is a schematic of an electrically-powered material-transport vehicle, according to some embodiments.

Referring to FIG. 3, there is shown a block diagram illustrating some of the systems and components of an electrically-powered vehicle 310. According to some embodiments, the electrically-powered vehicle 310 may be an example of a vehicle 110 shown in FIG. 1 and FIG. 2.

The electrically-powered vehicle 310 comprises a cap 312 that serves as both a cover to close the base of the vehicle 310, and as a load-bearing platform. In other words, the cap 312 can simultaneously cover the base of the vehicle 310, which houses the components and the systems of the vehicle 310, and also be used to transport a payload of considerable mass (e.g. 100 kg). The cap 312 can be raised and lowered by a cap elevator 314 attached to the cap 312.

In most cases, the cap elevator 314 is activated by a cap elevator motor 316 that may be, for example, an electric motor. According to some embodiments, the vehicle 310 may also be equipped with a manual winch 318 that can be used to activate the cap elevator 314, for example, in cases when the cap elevator motor 316 is unavailable or unable to raise or lower the cap 312 as desired. For example, if the cap elevator motor 316 is malfunctioning or insufficient power is available for the cap elevator motor 316 (such as in the case of a dead battery), the cap 312 can be raised or lowered using the manual winch 318. In the example of FIG. 3, the connection between the cap elevator motor 316 and a battery is not shown, for the sake of simplicity of explanation.

The vehicle 310 includes an electric drive motor 320 for driving the wheels of the vehicle (not shown in FIG. 3). The vehicle 310 also includes and a battery 322 for providing electricity to the electrical systems of the vehicle 310, including the motor 320.

According to some embodiments, the vehicle 310 may have multiple drive motors 320. For example, a drive motor 320 may be associated with a particular wheel of the vehicle in order to drive the wheel independently of other wheels, such as in a differential configuration. In other cases, wheels on the vehicle 310 may be driven together through a drive train that links the drive motor 320 with the wheels.

The battery 322 may comprise multiple batteries, such as a battery bank. The battery 322 is connected to a battery management unit 324 that monitors the status of the battery 322 including charge levels and other performance and usage data pertaining to the battery 322. According to some embodiments, the battery management unit 324 may include a computer having a process and memory (not shown), and/or the battery management unit 324 may be implemented in software, and run on a vehicle control system 334 having a processor and memory (i.e. implemented on a computer).

The battery 322 connects through switches 326 to charging contacts 328. Various configurations are contemplated, in which one or more switches 326 may be used as necessary. Two switches 326 are shown in FIG. 3 for the sake of explanation. The switches 326 may be any type of suitable electrical switches that can be controlled with an electric signal, such as relays, solid-state switches, etc. The switches 326 may be biased so that they are open (i.e. providing an open circuit) unless a signal is being received to maintain the switches 326 in a closed position.

Generally speaking, the switches 326 are used in order to electrically isolate the charging contacts 328 from the battery 322 whenever the battery 322 is not being charged.

The vehicle 310 may also include at least one signal contact 330. Two signal contacts 330 are shown in FIG. 3. The signal contacts 330 can be used to transmit a signal from the vehicle 310 to a charging dock, via corresponding signal contacts on the charging dock.

The vehicle control system 334 generally provides control for the vehicle 310. As shown, the vehicle control system 334 may be in communication with the drive motor 320, the elevator motor 316, the switches 326, the signal contacts 330, and the battery-management unit 324. As such, the vehicle control system 334 can operate to control the motion of the vehicle 310, raise or lower the cap 312, connect or disconnect the charging contacts 328 and the battery 322, send or receive signals via the signal contacts 330, and send enquiries or receive reports from the battery-management unit 324 in regards to the battery 322.

Furthermore, the vehicle 310 may include at least one optical sensor 332 in communication with the vehicle control system 334. The optical sensor may be a LiDAR, image sensor (e.g. camera), or another optical sensor. (While a LiDAR may not always be considered as an "image sensor" in other contexts, it is considered as an optical sensor herein). Optical sensors 332 can be used to capture images and detect objects within the environment of the vehicle 310, for example, as may be used in navigating the vehicle 310 using the vehicle control system 334.

According to some embodiments, the vehicle control system 334 may also be in communication with a transceiver 336. The transceiver 336 allows the vehicle control system 334 to be in communication with a fleet-management system (e.g. via communications link 118a).

Figure 4:
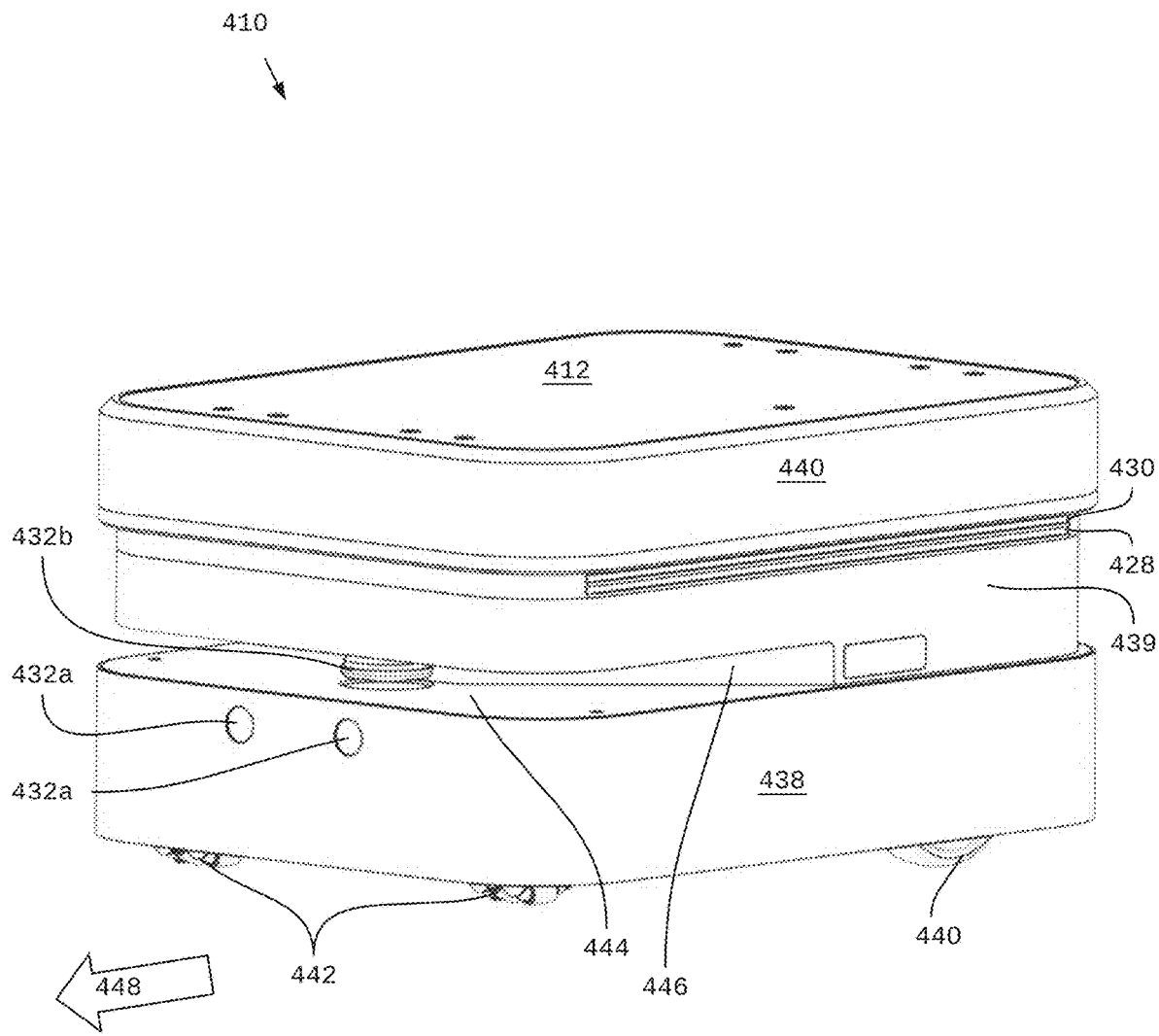
FIG. 4 is an orthographic projection of an electrically-powered material-transport vehicle, according to some embodiments.

Referring to FIG. 4, there is shown a vehicle 410 according to some embodiments. According to some embodiments, the vehicle 410 may be an example of a vehicle 110 shown in FIG. 1, and/or a vehicle 310 as shown in FIG. 3. The arrow 448 generally indicates the forward direction of motion for the vehicle 410 under normal operation.

The vehicle 410 has a base 438 that generally supports and houses the internal components of the vehicle 410, such as the motor, battery, vehicle control system, etc. A cap 412 is attached to the base 438, which simultaneously serves as a cover to enclose internal components within the base 438, as well as a load-bearing platform capable of supporting a payload that can be transported using the vehicle 410. In other words, the cap 412 may be sized to cover the top of the base, and may be designed to withstand the force of a heavy payload. For example, the cap 412 may be assembled from metal, or made from a single piece of metal, in order to support payloads upwards of 240 to 250 kg/m$^2$.

According to some embodiments, the cap 412 may include a side cover 440 extending downward from the cap 412.

The side 439 of the base 438 includes a vehicle-charging contact and a vehicle-signal contact. As shown in FIG. 4, the vehicle-charging contact is a vehicle-charging rail 428 that extends for the length of the side 439 of the base 438. The vehicle-signal contact, in the embodiment shown, is a vehicle-signal rail 430 that extends for the length of the side 439 of the base 438. In some embodiments, the position of the vehicle-charging contact 428 and the vehicle-signal contact 430 may be interchanged. Other configurations are also contemplated, for example, if the vehicle-charging contact and the vehicle-signal contact do not extend for the entire length of the side 439 of the base 438, then one contact may be placed ahead of or to the rear of the other.

As used herein, the term "side" (as in "side of the vehicle"), refers specifically to the surface of the vehicle that is generally vertical and parallel to the direction of the vehicle's motion when the vehicle is travelling in a straight line. A "side" of the vehicle is specifically distinct from the front of the vehicle, the back (or rear) of the vehicle, the top (or roof) of the vehicle, or the bottom (or underside) of the vehicle.

According to some embodiments the opposite side of the vehicle 410 (not shown in FIG. 4) may be similarly configured as the side 439 shown. In other words, a second vehicle-charging contact may be placed on the opposite side of the vehicle 410. Since a pair of electrical contacts are generally required in order to apply a charging voltage to a battery, the vehicle-charging contact 428 on the side 439 of the vehicle 410 and the vehicle-charging contact on the opposite side of the vehicle 410 can form a pair of electrical contacts in order to receive a charging voltage. Alternatively, it is possible to include the pair of vehicle-charging contacts on the same side of the vehicle 410.

The vehicle 410 may also include optical sensors 432. In the embodiment shown, the optical sensors 432 include a pair of cameras 432a and a LiDAR 432b. According to some embodiments, the LiDAR may be located towards the center of the base 438 rather than on an outer edge or face of the vehicle 438. For example, a LiDAR may be placed on the front face, rear face, and/or side faces of the base 438 so that the LiDAR can have line-of-sight to objects that are in front of, behind, or beside the base 438. However, in the embodiment shown, the base 438 includes cut-out sections defined by a horizontal surface 444 and a vertical surface 446. As shown, the vertical surface 446 is at an angle to the side 439, and extends from the location of the LiDAR 432b to the surface of the side 439. Similarly, there is another vertical surface (not shown) that extends from the location of the LiDAR 432b to the surface of the opposite side. In a plan view, the two vertical surfaces (including vertical surface 446) would appear as a wedge, with the LiDAR 432b located at the apex of the wedge. For example, the two vertical surfaces 446 may meet at an angle of 90 degrees (and may each meet their respective sides at 45 degrees).

The location of the optical sensor (e.g. LiDAR) 432b in combination with the cut-away as defined by the horizontal surface 444 and the vertical walls 446, allows the optical sensor 432b to have an increased field of view as compared to am optical sensor mounted on the front surface of the vehicle 410, and also allows the optical sensor 432b to be contained within the perimeter of the base 438. Thus, in the previous example in which the vertical surfaces 446 meet at an angle of 90 degrees, the optical sensor can obtain a field-of-view of up to 270 degrees. In other words, by using the cut-away of the base 438 as defined by the horizontal surface 444 and vertical walls 446, a single optical sensor 432b can replace individual optical sensors each placed on the front and two sides of the vehicle 410.

According to some embodiments, all sensors (e.g. optical sensors 432a and 432b) are included on the base 438 rather than the cap 412, since the cap 412 is movable, and the inclusion of superfluous components on the moveable cap 412 may introduce further design requirements.

The vehicle 410 includes at least one drive wheel 440. According to some embodiments, the vehicle 410 may also include at least one non-drive wheel, such as the two castors 442 shown.

Figure 5:
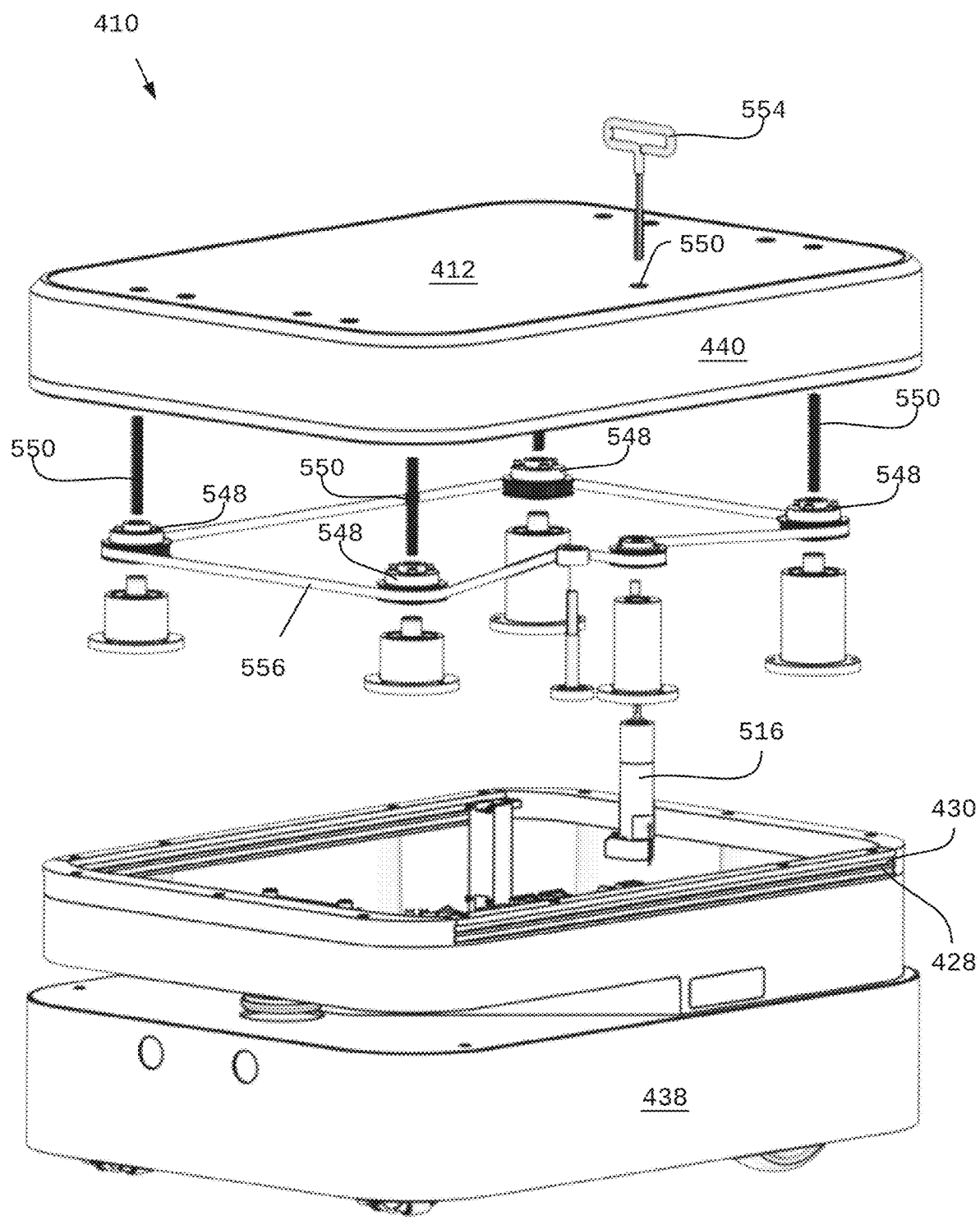
FIG. 5 is an exploded view of the vehicle of FIG. 4.

Referring to FIG. 5, there is shown an exploded view of the vehicle 410, showing some of the components housed within the vehicle 410, according to some embodiments.

The vehicle 410 includes a cap elevator for raising and lowering the cap 412. According to some embodiments, the cap elevator comprises an elevator motor 516 that drives a belt 556, which in turn drives followers 548 (e.g. pulleys). Each follower 548 is attached to a lead screw 550 that, when turned, raises or lowers the cap 412. According to some embodiments, the cap elevator may also include a winch 550 that drives the belt 556, either by driving the elevator motor 516, or otherwise. The winch 550 is located on, or accessible through the cap 412, so that it can be manually turned, for example, by a crank 554. In this way, the manual winch 550 can be used to raise or lower the cap in the event that the elevator motor 516 is not available (e.g. the elevator motor 516 is not functioning).

Figure 6:
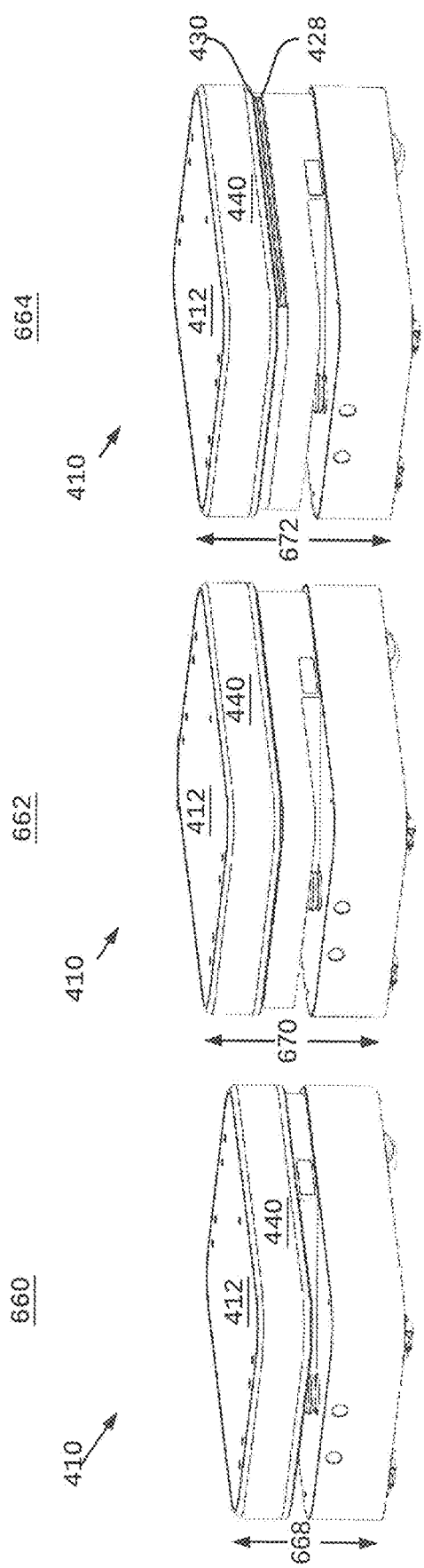
FIG. 6 is an orthographic projection showing the vehicle of FIG. 4 with three exemplary vehicle cap positions.

Referring to FIG. 6, there are shown examples 662, 664, and 666 of a vehicle 410. In the first example 660, the cap 412 of the vehicle 410 is in a transit position, defined by the height 668 of the cap 412. In the second example 662, the cap 412 of the vehicle 410 is in a payload-engagement position defined by the height 670 of the cap 412. In the third example 664, the cap 412 of the vehicle 410 is in a charging position defined by the height 672 of the cap 412.

The cap 412 is generally maintained at the height 668 in the transit position when the vehicle 410 is moving without a payload, whereas the cap 412 is generally maintained at the height 670 in the payload-engagement position when the vehicle 410 is transporting a payload. Thus, according to some embodiments, the difference between the heights 670 and 668 may be based on the height that is required in order to have the cap 412 engage with the payload.

The cap 412 is generally maintained at the height 672 in the charging position when the vehicle 410 is in a charging dock. As can be seen in FIG. 6, the vehicle-charging contacts 428 and vehicle-signal contacts 430 are only exposed when the cap 412 is at a height of 672 (or greater). Thus, according to some embodiments, the height 672 is based on a height that is required in order for the contacts to be exposed from under the side covers 440 of the cap 412. At any height below 672, the vehicle-charging contacts 428 and the vehicle-signal contacts 430 are concealed by the side covers 440 of the cap 412.

A fourth position of the cap 412, referred to as the maintenance position, is not shown in FIG. 6. The maintenance position is achieved by raising the cap 412 until the cap 412 is raised sufficiently to provide access to the internal components of the vehicle 410. For example, and in reference to FIG. 5, the motor 516 and/or winch 550 can be turned to raise the cap 412 until the cap 412 disengages from the lead screws 550. When the cap disengages from the lead screws 550, the cap 412 can be removed from the base 438, thereby providing access inside the base 438. Since the cap can be raised (and therefore removed) using the manual winch 550, the cap 412 can be removed to inspection and maintenance even when the motor 516 is unavailable.

Figure 7:
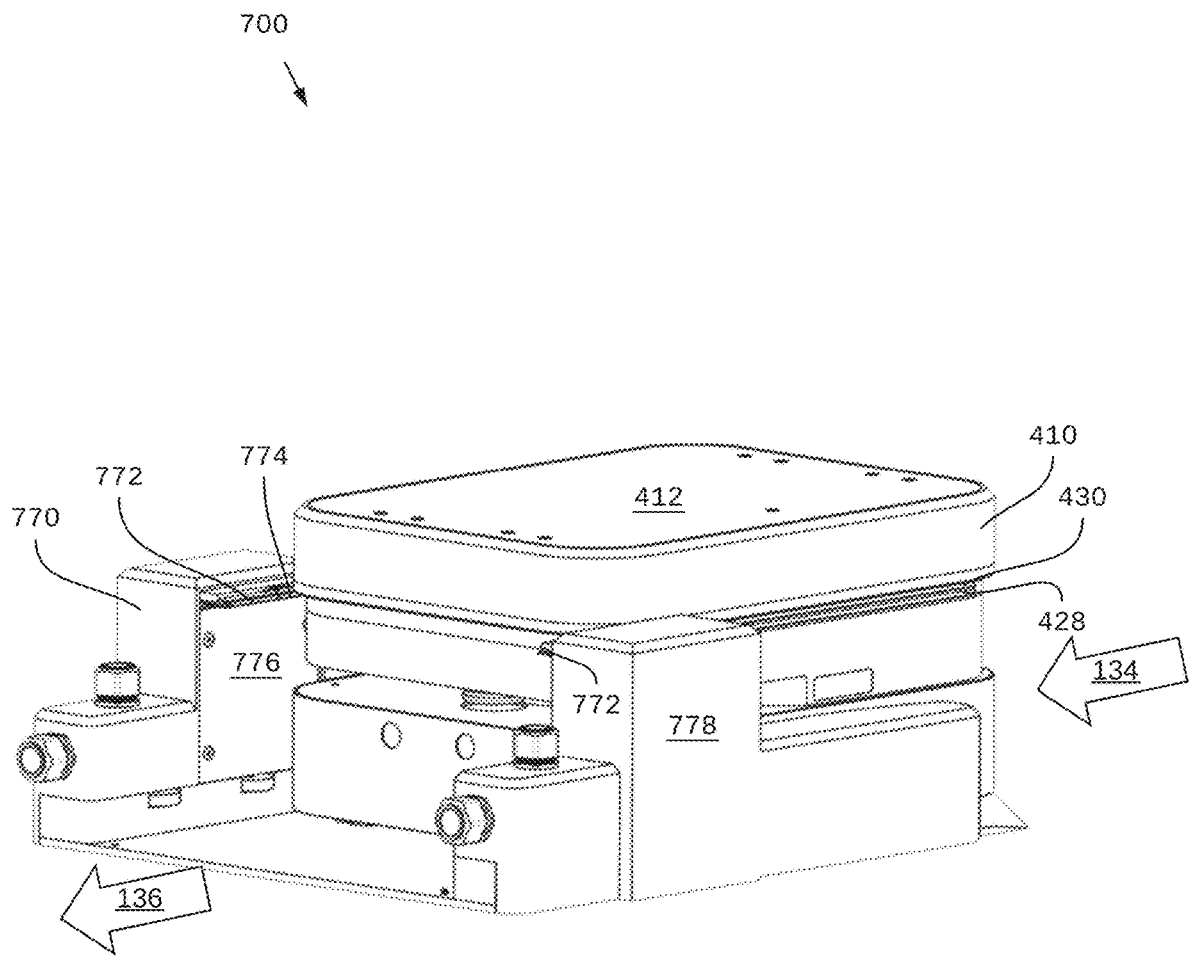
FIG. 7 is a system for charging the vehicle of FIG. 4, including a charging dock according to some embodiments.

Referring to FIG. 7, there is shown a system 700 for charging an electric vehicle, such as vehicle 410, with a charging dock 770.

The charging dock 770 has a charging contact 772 and a signal contact 774 on one side 776 of the charging dock 770. According to some embodiments, the charging dock 770 may include a charging contact 772 and/or a signal contact on the other side 778 of the charging dock 770.

The size, shape, position, and number of the charging contacts 772 and signal contacts 774 on the charging dock 770 are selected to correspond with the vehicle-charging contacts and vehicle-signal contacts of a particular vehicle. For example, as shown for the vehicle 410 in FIG. 7, the charging contacts 772 correspond to the vehicle-charging rail 428, and the signal contacts 774 correspond to the vehicle-signal rails 430 of the vehicle 410. The charging contacts 772 and/or signal contacts 774 may be biased towards the center of the charging dock 770 (i.e. towards the corresponding vehicle-charging rails 428 and vehicle-signal rails 430 as shown) in order to allow the vehicle 410 to enter the charging dock 770 while still maintaining an electrical connection between the charging contact 772 and the vehicle-charging rail 428, as well as between the signal contact 774 and the vehicle-signal contact 430.

As shown in FIG. 7, the cap 412 of the vehicle 410 is at the height 672 corresponding to the charging position corresponding to the example 664 as shown in FIG. 6.

According to some embodiments, the charging dock 770 may be in communication with one or both of a charge controller and a charger. According to some embodiments, the charging dock 770 may include (i.e. house) a charge controller and/or a charger, whereas, in other embodiments, the charge controller and/or charger may be external to the charging dock 770.

The dock-entry arrow 134 and the dock-exit arrow 136 generally indicate the direction that the vehicle 410 may move when entering and exiting the charging dock 770, for example, in the drive-through configuration. According to some embodiments, placing the charging contacts 774 and signal contacts 776 on the side of the charging dock 770 (and, by association, placing the vehicle-charging contacts 428 and the vehicle-signal contacts 430 on the side of the vehicle 410) allows for the vehicle 410 to have an unobstructed path through into, through, and out of the charging dock 770 while traveling in a single direction. In other words, the particular configuration of the charging station 770 allows for the dock-entry arrow 134 to be in the same direction as the dock-exit arrow 136.

Figure 8:
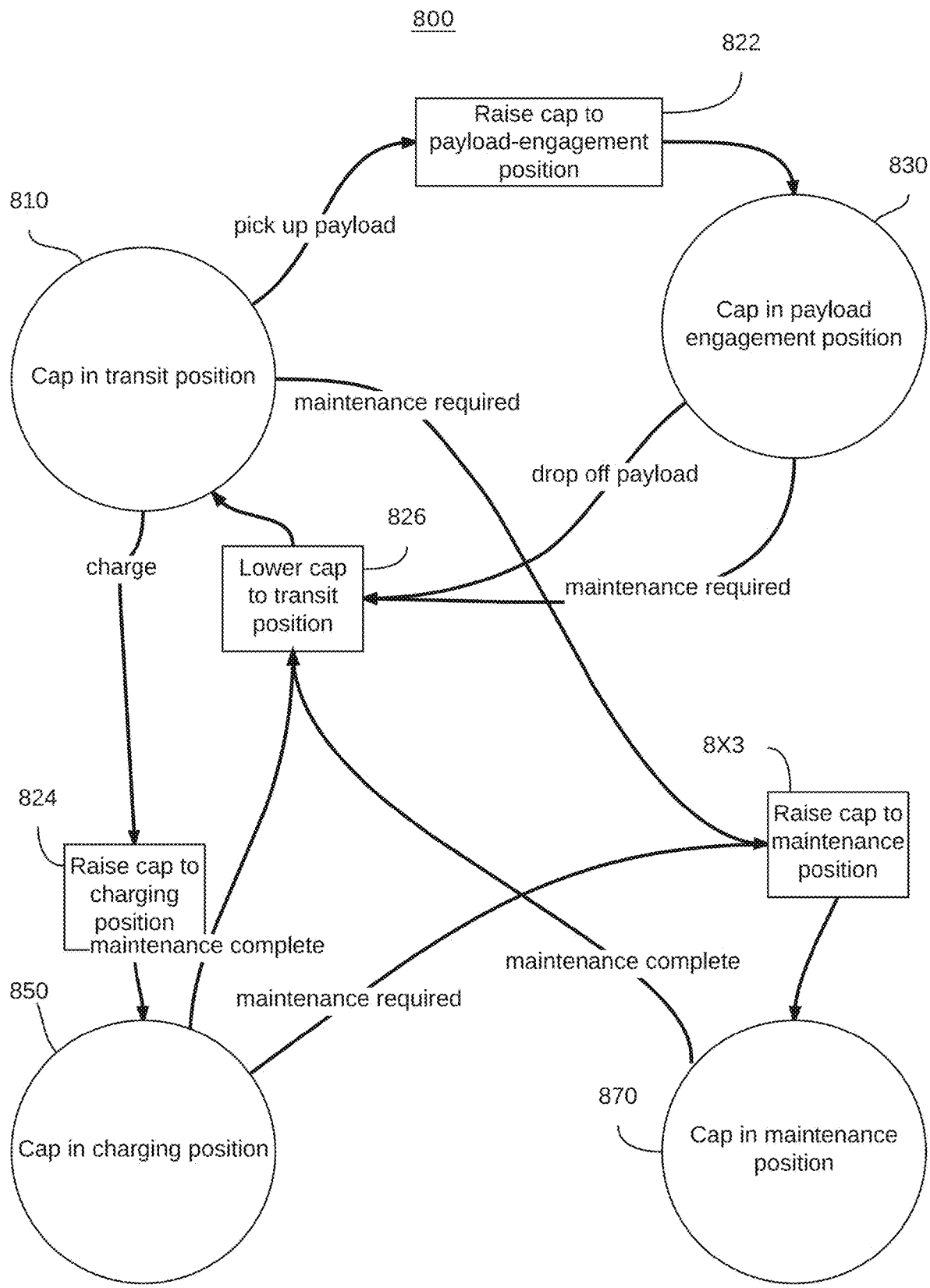
FIG. 8 is a flow diagram depicting methods for operating and maintaining an electrically-powered material-transport vehicle, according to some embodiments.

Referring to FIG. 8, there is shown a diagram 800 depicting methods in which the cap may be raised or lowered. For the purpose of explanation, the diagram 800 assumes that the cap may be in one of four discrete positions, with: the cap in a transit position 810; the cap in a payload-engagement position 830; the cap in a charging, position 850; or the cap in a maintenance position 870. According to some embodiments, and in reference to FIG. 6, the transit position 810 corresponds to the example 660, the payload-engagement position 830 corresponds to the example 662, and the charging position 850 corresponds to the example 664.

While the diagram 800 depicts the cap in the four discrete positions 810, 830, 850, and 870, it should be understood that, in some embodiments, the cap may be raised or lowered to occupy only these discrete positions (and transitions there between), whereas, in other embodiments, the cap may be raised or lowered continuously and maintained at any height within the range of the cap elevator. The discrete positions of the cap, whether for the purposes of explanation, or as used in a particular embodiment, follow the description of the cap positions as previously described.

As provided by the diagram 800, methods may be determined based on different goals and/or missions for which a vehicle may be used at any particular time, as well as on conditions experienced by the vehicle such as a requirement or request for the vehicle's battery to be charged, or for maintenance to be performed on the vehicle.

Figure 9:
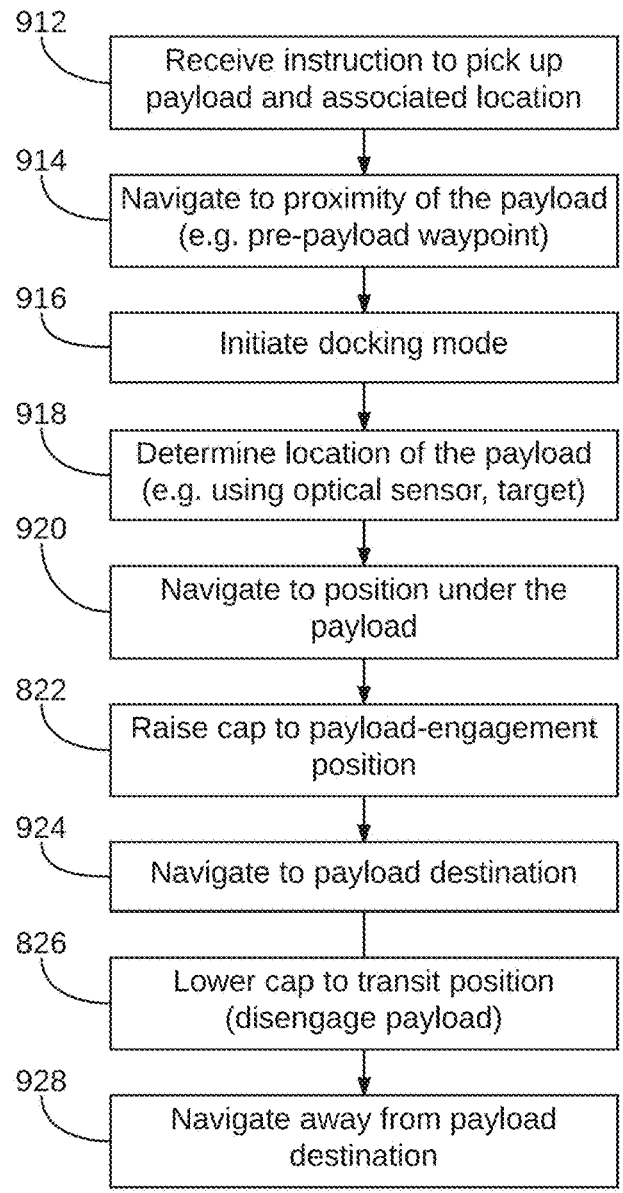
FIG. 9 is a flow diagram depicting methods for transporting a payload with a material-transport vehicle, according to some embodiments.

For example, referring to FIG. 9, there is shown a method 900 for transporting a payload with the vehicle. The method starts at 910, when the vehicle cap is in the transit position (e.g. as at 810). At step 912, the vehicle receives or begins to execute instructions that include picking up a payload. The instructions that include picking up a payload may be received by the vehicle from a fleet-management system, or from another computer system. A location associated with the payload is also received (separately or as a part of the instructions) from the fleet-management system or other computer system.

The location associated with the payload is located within a proximity (e.g. a radius) of the payload. According to some embodiments, the proximity may be based on the characteristics and/or performance of optical sensors on the vehicle. For example, the proximity may be set such that the optical sensors are capable of capturing images of objects within the proximity with sufficient accuracy to identify and locate the objects within the images.

The proximity of the payload distinguishes the area around the payload in which the vehicle can rely on its optical sensors and autonomous navigation system in order to determine the location of the payload without requiring that the precise location of the payload be provided by the fleet-management system or other computer system external to the vehicle, or that the vehicle be able to navigate to the payload with sufficient accuracy using only a map.

According to some embodiments, the location associated with the payload may be a pre-payload way point. For example, a pre-payload waypoint may be provided to the vehicle by the fleet-management system, and the vehicle may navigate to the pre-payload waypoint based on the pre-payload waypoint location provided by the fleet-management system.

At step 914, the vehicle navigates and drives itself so that it is within the proximity of the payload. For example, if a pre-payload waypoint was provided to the vehicle by the fleet-management system, then the vehicle will navigate itself to the pre-payload waypoint location. According to some embodiments, the step 914 includes the vehicle planning and executing its own path, for example, based on a map that is generated and/or stored on the vehicle.

At 916, the vehicle may initiate a docking mode. The docking mode is used to implement the systems and functions that the vehicle may require in order to dock (meaning "engage") with a payload. While in the docking mode, the vehicle may rely on the vehicle's sensors in order to perform local navigation. Furthermore, while in the docking mode, the vehicle may compare data obtained by the vehicle's sensors to known data patterns in order to identify objects sensed by the vehicle's sensors. For example, while in docking mode, images captured by an optical sensor on the vehicle may be compared with images of known target objects in order to determine if the vehicle has sensed a target object.

According to some embodiments, the vehicle may determine a particular payload from among a group of payloads. For example, several payloads may be located within a particular proximity (e.g. a distance from a waypoint). In this case, the vehicle may compare data obtained by the vehicle's sensors to known data patterns in order to identify if a particular payload is available (e.g. if the payload is empty). The vehicle may then proceed to determine the location of this particular payload.

At step 918, the location of the payload is determined by the vehicle. In other words, whereas at step 912 a location associated with the payload (e.g. a pre-payload waypoint) may have been provided to the robot by an external system such as the fleet-management system, at 918, the location of the payload is determined by the vehicle itself.

The vehicle may use its optical sensor (or multiple optical sensors, and/or vision system) and the vehicle's processor and memory in order to determine the payload location. In some embodiments, different types of sensors other than optical sensors may be used alone or in combination with optical sensors.

According to some embodiments, an optical sensor such as a LiDAR sensor or a camera can be used to capture an image. The captured image can then be compared to a known image of a target associated with the payload. If the comparison is positive—in other words, if it is determined that the captured image includes the target—then the vehicle determines the payload location based on the location of the target.

Once the vehicle has determined the location of the payload during step 918, then, at step 920, the vehicle navigates to a position that is under the payload.

According to some embodiments, the vehicle may navigate to a position under the payload using vision-based navigation based on the payload location as determined at step 918. According to some embodiments, vision-based navigation may be used, but, in some cases, a view of the payload may be subsequently lost, and vision-based navigation may no longer be reliable. In this case, other means of navigation may be used, such as based on wheel odometry, visual odometry, and inertial data, in order to navigate the vehicle based on the location of the payload as originally determined using the optical sensors At step 822, the vehicle cap is raised in order to engage with the payload. For example, the payload may mate with the vehicle cap, such as by using a structure with a size and shape that complements the size and shape of the vehicle cap. In some embodiments, the vehicle cap may be raised in order to engage with the payload by applying pressure to a flat, horizontal underside of the payload, thereby using friction in order to engage the vehicle cap with the payload.

Once the vehicle cap has been raised to the payload-engagement position, and the payload has been engaged, the payload will be transported by the vehicle in accordance with the vehicle's movements. At step 924, the vehicle navigates to a payload destination, thereby transporting the payload.

According to some embodiments, the payload destination may be provided to the vehicle by a system that is external to the vehicle itself, such as a fleet-management system. For example, the fleet-management system may send location information for the payload destination to the vehicle, and then the vehicle may navigate to the payload destination based on the location information received from the fleet-management system.

Once the vehicle has navigated to the payload destination, then, at step 826, the vehicle cap is lowered in order to disengage the payload. Once the payload has been disengaged and the vehicle can move without transporting the payload, then, at step 928, the vehicle navigates away from the payload destination.

Referring again to FIG. 8, according to some embodiments, the method 900 can be seen as beginning with the cap in the transit position 810, transporting a payload by raising the cap to the engagement position 830, and then returning the cap to the transit position 810 after the payload has been dropped off at its destination location.

Figure 10:
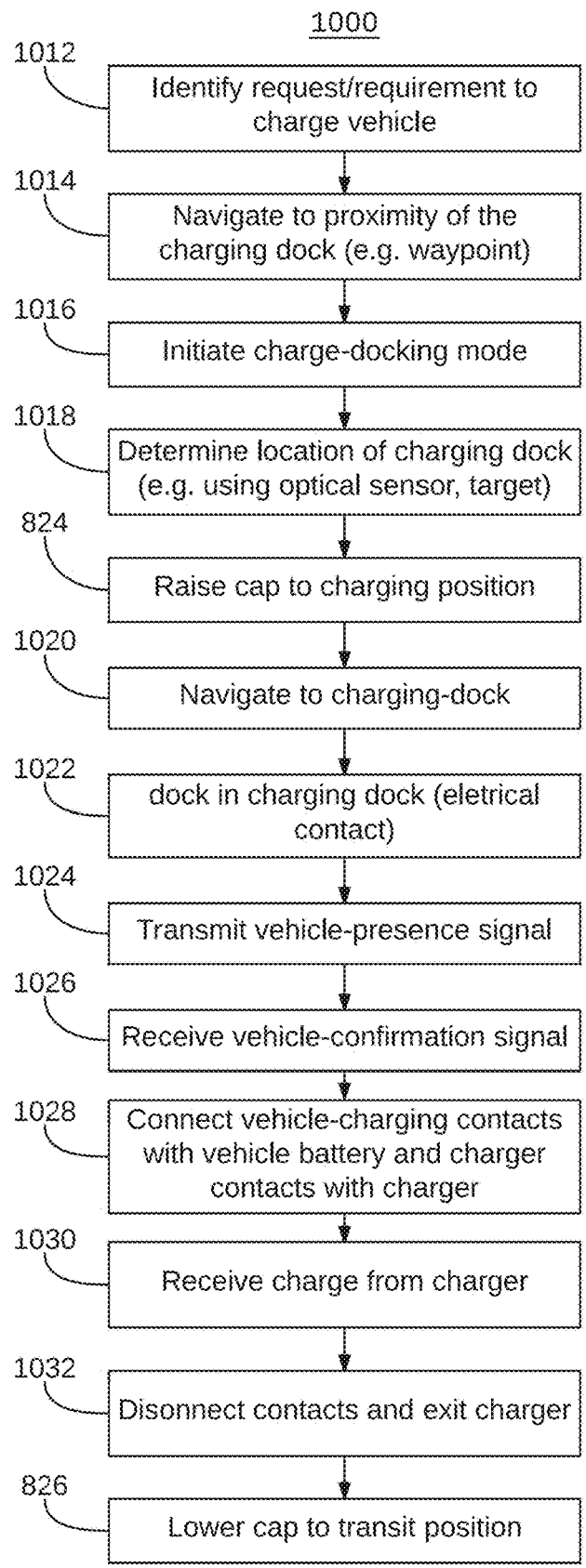
FIG. 10 is a flow diagram depicting methods of charging and recharging an electrically-powered material-transport vehicle, according to some embodiments.

According to some embodiments, other methods may be determined as well, such as a method for charging a vehicle. Referring to FIG. 10, there is shown a method 1000 for charging a vehicle.

The method begins at step 1012, when a request or requirement to charge the vehicle is identified. In some cases, the vehicle itself may identify when a charge is required or preferred. In some cases, the fleet-manager may identify when a charge is required or preferred.

At step 1014, the vehicle navigates and drives itself so that it is within the proximity of the charging dock. For example, if a pre-dock waypoint was provided to the vehicle by the fleet-management system, then the vehicle will navigate itself to the pre-dock waypoint location. According to some embodiments, the step 1014 includes the vehicle planning and executing its own path, for example, based on a map that is generated and/or stored on the vehicle.

At 1016, the vehicle may initiate a docking mode. The charge-docking mode is used to implement the systems and functions that the vehicle may require in order to dock in a charging dock. While in the charge-docking mode, the vehicle may rely on the vehicle's sensors in order to perform local navigation. Furthermore, while in the charge-docking mode, the vehicle may compare data obtained by the vehicle's sensors to known data patterns in order to identify objects sensed by the vehicle's sensors. For example, while in charge-docking mode, images captured by an optical sensor on the vehicle may be compared with images of known target objects in order to determine if the vehicle has sensed a target object.

According to some embodiments, the vehicle may determine a particular charging dock, from among a group of charging docks. For example, several charging docks may be located within a particular proximity (e.g. a distance from a waypoint). In this case, the vehicle may compare data obtained by the vehicle's sensors to known data patterns in order to identify if a particular charging dock is available (i.e. not otherwise in use). The vehicle may then proceed to determine the location of this particular charging dock.

At step 824, the vehicle cap is raised to a charging position. In particular, the vehicle cap is raised in order to expose vehicle-charging contacts, and, in some embodiments, vehicle-signal contacts that are otherwise covered by the cap when the cap is in a lower position.

Once the location of the charging dock is known and the cap has been raised to the charging position, then, at step 1020, the vehicle navigates to the charging dock. According to some embodiments, the cap may be raised to the charging position at the same time as previously-described steps are being executed. For example, the cap can be raised while the vehicle is determining the location of the charging dock in charge-docking mode, and/or the cap can be raised while the vehicle is navigating to the charging dock within the proximity described in association with step 1014

According to some embodiments, the vehicle may navigate to the charging dock using vision-based navigation based on the location of the charging dock as determined at step 1018. According to some embodiments, vision-based navigation may be used, but, in some cases, a view of the charging dock may be subsequently lost, and vision-based navigation may no longer be reliable. In this case, other means of navigation may be used, such as based on wheel odometry, visual odometry, and inertial data, in order to navigate the vehicle based on the location of the charging dock as originally determined using the optical sensors.

At step 1022, the vehicle docks in the charging dock, which includes making an electrical connection between the vehicle-charging contacts on the vehicle, and the charging contacts on the charging dock. According to some embodiments, docking the vehicle may also include making an electrical connection between one or more vehicle-signal contacts on the vehicle and corresponding signal contacts on the charging dock.

At step 1026, the vehicle may transmit a vehicle-presence signal to the charging dock. According to some embodiments, this may include sending a basic electric signal through the vehicle-signal contacts on the vehicle to the signal contacts on the charging dock. For example, the vehicle-presence signal may be a square wave. Generally, the vehicle-presence signal is intended to verify that the vehicle has been properly docked in the charging dock, and that electrical connections have been made, as previously described. According to some embodiments, the vehicle may be designed so that the vehicle-signal contacts are of a similar form as the vehicle-charging contacts, so that, when the electrical connection between the vehicle-signal contacts and the charging dock has been verified, a reasonable assumption can be made that an electrical connection between the vehicle-charging contact has also been made.

At step 1028, the vehicle may receive a vehicle-confirmation signal from the charging dock, in response to the vehicle-presence signal that was previously transmitted by the vehicle. According to some embodiments, the vehicle-confirmation signal may be generated by a charge controller, and transmitted to the vehicle via the signal contacts in the charging dock. For example, the charge controller may execute logic to indicate that the vehicle-presence signal has been properly received by the charge controller.

According to some embodiments, the vehicle-confirmation signal may be the vehicle-presence signal, returned to the vehicle through a closed circuit. For example, if each side of the charging dock has a signal contact, corresponding to a vehicle-signal contact on each side of the vehicle, and if the signal contacts are electrically connected (such as by a conductor running under or through the base of the charging dock), then, when a vehicle-presence signal is transmitted through one vehicle-signal contact on one side of the vehicle, it can be received via the vehicle-signal contact on the other side of the vehicle, thus verifying that electrical connections have been made between the vehicle-signal contacts of the vehicle and signal contacts of the charging dock on both sides, thereby confirming that the vehicle has been properly docked.

At step 1028, the vehicle-charging contacts may be connected to the vehicle battery, for example, by closing switches (e.g. relays) between the vehicle-charging contacts and the vehicle battery. According to some embodiments, this may be done in response to the vehicle-confirmation signal being received. In this way, the vehicle-charging contacts can be isolated from the vehicle battery at all times except when the vehicle is properly docked in the charging dock.

Similarly, at step 1028, the charger contacts of the charging dock can be electrically connected to the charger, such as by closing a switch. According to some embodiments, this may be done in response to the vehicle-presence signal being received by the charging dock or charge controller. In this way, the charging contacts of the charging dock can be isolated from the charger at all times except when the vehicle is properly docked in the charging dock.

Once electrical connections are in place between the charger, the charging contacts, the vehicle-charging contacts, and the vehicle battery, then, at step 1030, a charge can be received from the charger.

At step 1032, when the charging cycle has ended, the vehicle is ready to exit the charger. According to some embodiments, prior to the vehicle exiting the charger, the vehicle-charging contacts may be disconnected from the vehicle batter, such as by opening a switch. Similarly, the charger contacts of the charging dock may be disconnected from the charger.

When the vehicle is ready to exit the charging dock, the vehicle drives out of the charging dock. According to some embodiments, the vehicle may drive out of the charging dock in the same direction as when the vehicle entered the charging dock (i.e. "drive-through" charging). In other words, with drive-through charging, the vehicle does not have to reverse out of the charging dock.

Once the vehicle has exited the charging dock, then, at step 826, the vehicle cap is lowered to the transit position. In particular, the vehicle cap is lowered so that the vehicle-charging contacts are covered by the vehicle cap. According to some embodiments, lowering the vehicle cap also ensures that the vehicle-signal contacts are covered.

The present invention has been described here by way of example only. Various modification and variations may be made to these exemplary embodiments without departing from the spirit and scope of the invention, which is limited only by the appended claims.

We claim:

1. An electrically-powered vehicle for transporting a payload, comprising:
    a base having a first vehicle-charging contact on a first side of the base;
    a cap elevator attached to the base and extendible from a first position upwards from the base to a second position; and
    a cap having a first side cover corresponding to the first vehicle-charging contact, the cap being attached to the cap elevator such that, when the cap elevator is in the first position, the first vehicle-charging contact is covered by the first side cover, and when the cap elevator is in the second position, the first vehicle-charging contact is not covered by the first side cover, wherein the cap is a load bearing platform for transporting the payload.

2. The vehicle of claim 1, wherein the cap is sized to cover the top of the base.

3. The vehicle of claim 1, further comprising a battery and a first switch connected to the battery and the first vehicle-charging contact for electrically connecting and electrically disconnecting the battery and the first vehicle-charging contact.

4. The vehicle of claim 1, further comprising a first vehicle-signal contact on the base for sending a signal to a corresponding charger-signal contact on a charging dock.

5. The vehicle of claim 4, wherein the first vehicle-signal contact comprises a rail that extends along at least part of a length of the first side of the base.

6. The vehicle of claim 4, wherein the first vehicle-signal contact is parallel to the first vehicle-charging contact.

7. The vehicle of claim 4, wherein the first vehicle-signal contact is colinear with the first vehicle-charging contact.

8. The vehicle of claim 4, further comprising a second vehicle-signal contact on the base for receiving a signal from another corresponding charger-signal contact on the charging dock.

9. The vehicle of claim 8, wherein the first vehicle-signal contact is located on the first side of the base and the second vehicle-signal contact is located on the second side of the base.

10. The vehicle of claim 8, wherein the second vehicle-signal contact comprises a rail that extends along at least part of a length of the second side of the base.

11. An electrically-powered vehicle for transporting a payload, comprising:
    a base having a first vehicle-charging contact on a first side of the base;
    a cap elevator attached to the base and extendible from a first position upwards from the base to a second position;
    a cap having a first side cover corresponding to the first vehicle-charging contact, the cap being attached to the cap elevator such that, when the cap elevator is in the first position, the first vehicle-charging contact is covered by the first side cover, and when the cap elevator is in the second position, the first vehicle-charging contact is not covered by the first side cover;
    a second vehicle-charging contact on a second side of the base; and
    a second side cover corresponding to the second vehicle-charging contact such that, when the cap elevator is in the first position, the second vehicle-charging contact is covered by the second side cover, and when the cap elevator is in the second position the second vehicle-charging contact is not covered by the second side cover.

12. The vehicle of claim 11, wherein the cap is sized to cover the top of the base.

13. The vehicle of claim 11, wherein the second vehicle-charging contact comprises a rail that extends along at least part of a length of the second side of the base.

14. The vehicle of claim 11, further comprising a battery and a first switch connected to the battery and the first vehicle-charging contact for electrically connecting and electrically disconnecting the battery and the first vehicle-charging contact.

15. The vehicle of claim 14, further comprising:
a second switch connected to the battery and the second vehicle-charging contact for electrically connecting and electrically disconnecting the battery and the second vehicle-charging contact.

16. The vehicle of claim 11, further comprising a first vehicle-signal contact on the base for sending a signal to a corresponding charger-signal contact on a charging dock.

17. An electrically-powered vehicle for transporting a payload, comprising:
a base having a first vehicle-charging contact on a first side of the base;
a cap elevator attached to the base and extendible from a first position upwards from the base to a second position; and
a cap having a first side cover corresponding to the first vehicle-charging contact, the cap being attached to the cap elevator such that, when the cap elevator is in the first position, the first vehicle-charging contact is covered by the first side cover, and when the cap elevator is in the second position, the first vehicle-charging contact is not covered by the first side cover, wherein the first vehicle-charging contact comprises a rail that extends along at least part of a length of the first side of the base.

18. The vehicle of claim 17, wherein the cap is sized to cover the top of the base.

19. The vehicle of claim 17, further comprising a battery and a first switch connected to the battery and the first vehicle-charging contact for electrically connecting and electrically disconnecting the battery and the first vehicle-charging contact.

20. The vehicle of claim 17, further comprising a first vehicle-signal contact on the base for sending a signal to a corresponding charger-signal contact on a charging dock.

* * * * *